United States Patent
Sukhanov et al.

(10) Patent No.: US 7,489,989 B2
(45) Date of Patent: Feb. 10, 2009

(54) SYSTEM FOR DISPATCHING AND CONTROLLING OF GENERATION IN LARGE-SCALE ELECTRIC POWER SYSTEMS

(76) Inventors: Oleg Alexeevich Sukhanov, Balaklavsky pr., Moscow (RU); Yury Vladimirovich Sharov, 3-449 113639, Moscow (RU); Vasily Alexeevich Makeechev, Zoologichesky per., Moscow (RU)

( * ) Notice: Subject to any disclaimer, the term of this patent is extended or adjusted under 35 U.S.C. 154(b) by 157 days.

(21) Appl. No.: 10/598,720

(22) PCT Filed: Mar. 10, 2005

(86) PCT No.: PCT/RU2005/000112
§ 371 (c)(1), (2), (4) Date: Sep. 8, 2006

(87) PCT Pub. No.: WO2005/088413
PCT Pub. Date: Sep. 22, 2005

(65) Prior Publication Data
US 2007/0179675 A1  Aug. 2, 2007

(30) Foreign Application Priority Data
Mar. 11, 2004  (RU) .............................. 2004106772

(51) Int. Cl.
| | |
|---|---|
| G05D 3/12 | (2006.01) |
| G05D 5/00 | (2006.01) |
| G05D 11/00 | (2006.01) |
| G05D 17/00 | (2006.01) |
| G05B 11/01 | (2006.01) |
| G01R 21/00 | (2006.01) |
| G01R 21/06 | (2006.01) |
| G01R 11/56 | (2006.01) |
| G01R 21/133 | (2006.01) |
| G06F 19/00 | (2006.01) |
| G06F 17/00 | (2006.01) |

(52) U.S. Cl. .......................... 700/291; 700/22; 702/62; 705/412

(58) Field of Classification Search .................. 700/22, 700/286, 287, 291, 295; 705/37, 40, 412; 307/11, 18, 42, 147; 323/205; 290/7, 40 R, 290/52; 361/1, 62
See application file for complete search history.

(56) References Cited

U.S. PATENT DOCUMENTS

| | | | | |
|---|---|---|---|---|
| 5,760,492 | A * | 6/1998 | Kanoi et al. .................. 307/18 |
| 6,625,520 | B1 * | 9/2003 | Chen et al. .................. 700/286 |
| 6,766,224 | B2 * | 7/2004 | Tanaka ....................... 700/286 |
| 6,853,930 | B2 * | 2/2005 | Hayashi et al. ............. 700/287 |
| 6,882,904 | B1 * | 4/2005 | Petrie et al. ................. 700/295 |
| 7,321,810 | B2 * | 1/2008 | Mansingh et al. ........... 700/286 |
| 7,373,222 | B1 * | 5/2008 | Wright et al. ............... 700/295 |
| 2002/0036430 | A1 * | 3/2002 | Welches et al. .............. 307/18 |
| 2003/0225481 | A1 * | 12/2003 | Sealing et al. .............. 700/286 |
| 2004/0044442 | A1 * | 3/2004 | Bayoumi et al. ............ 700/286 |
| 2005/0137959 | A1 * | 6/2005 | Yan et al ..................... 705/37 |

FOREIGN PATENT DOCUMENTS

| | | |
|---|---|---|
| DE | 19508474 | 9/1996 |
| JP | 57197606 A | * 12/1982 |
| RU | 2213365 | 9/2003 |
| WO | WO 96/02025 | 1/1996 |
| WO | WO 03/014850 | 2/2003 |

OTHER PUBLICATIONS

O.A. Soukhanov, S.C. Shill "Application of functional modeling to the solution of electrical power systems optimization problems," Int. Journ. of Electrical Power and Energy Systems, vol. 22, No. 2, Feb. 2000.

* cited by examiner

Primary Examiner—Crystal J Barnes Bullock
(74) Attorney, Agent, or Firm—Fish & Richardson P.C.

(57) ABSTRACT

A system for dispatching and controlling generation in an electric power system consisting of a plurality of power units comprises a computer with dispatching optimization module connected by communications means to the power units. According to the invention, in the electric power system consisting of a plurality of subsystems each comprising a plurality of power plants provided with power units, said computer is a higher-layer computer and the specified load dispatching optimization module is designed to determine parameters for an optimal interchange of power and energy between subsystems. The inventive controlling system further comprises a plurality of computers according to a number of subsystems, said computers being lower-layer computers each comprising a specified subsystem dispatching optimization module designed to determine parameters for an optimal allocation of generation between power plants within a subsystem, and a unit for computation of functional characteristics for each subsystem, wherein each lower-layer computer is connected by lower-layer communications means to respective power plants of respective subsystems. The inventive controlling system also comprises higher-layer communications means, wherein the lower-layer computers are connected to a higher-layer computer via the higher-layer communications means.

4 Claims, 2 Drawing Sheets

SYSTEM FOR DISPATCHING AND CONTROLLING OF GENERATION IN LARGE-SCALE ELECTRIC POWER SYSTEMS

FIELD OF THE INVENTION

The present invention relates to power system management and control as well as automatics and computing machinery and more specifically to a system for dispatching and controlling of generation in large electric power systems consisting of a plurality of power plants upon which tough speed-of operation and reliability requirements are imposed.

BACKGROUND OF THE INVENTION

Known is an automation apparatus for developing and designing industrial facilities, particularly for developing, designing, realizing, bringing into service, maintaining, and optimizing individual components of a facility or packaged facilities (cf., RF Patent No. 2,213,365, Siemens AG, DE), that provides computer-based creation of mathematical and physical models of a process, neuron network models, and knowledge base systems, wherein decentralized execution and optimization of the process are carried out by one or more control stations that communicate with each other to form a control station network using modern communications means. The apparatus comprises a computer, control stations that communicate with each other by communications means in the form of a telephone, digital communications, satellite or Internet/Intranet communications network, that are embodied as technological central control stations spaced from the plant and communicating with a control system of an industrial facility by means of remote data transmission.

The disadvantage of said apparatus is control and optimization of individual plants that are small-dimensionality systems.

The closest technical solution is a power plant control system consisting of a plurality of power units (cf., RF Patent No. 2,138,840, Siemens AG, DE), said system comprising a computing unit, an optimization module connected thereto via data lines and connected to a plurality of neuron networks, wherein the computing unit is designed to determine driving values for that or other power unit of a power plant using a genetic algorithm, and each power unit is connected to a respective neuron network and to the computing unit via the data lines.

The computing unit determines a specified value for a power fraction of each power unit in the total load to be covered as a driving value F for said power unit for a specified time interval. The optimization module comprises a rough optimization stage and a fine optimization stage both connected to neuron networks, wherein the fine optimization stage automatically models a process. There is an individual neuron network to generate start values for the genetic algorithm of the computing unit as well.

The disadvantage of the present control system is the insufficient speed of operation in solution of problems of optimizing production processes in large industrial systems because of necessity to transmit all input information of characteristics of control objects included in the system to a central control apparatus comprising the computing unit and the optimization module associated therewith. Reverse transmission of solution results from said central apparatus to all controllable objects included in the system is necessary as well.

Thus, total volume of information to be transmitted for a large system of significant spatial extension is very large.

Another disadvantage of the prior art control system is that the case of solving a problem of optimizing an operation mode of a large system including a great number of power units and being described by a system of high-order equations stipulated a sequential mode of executing necessary computations in the optimization module of said system. When the dimensionality of a problem to be solved is large and a number of iterations necessary to solve said problem according to the mode optimization algorithm is significant, the volume of computations is bulky and a significant time is required to solve the present problem.

DISCLOSURE OF THE INVENTION

The object of the present invention is to provide a system for dispatching and controlling of power distribution between power plants of an electric power system, that allows reduction in total volume of information which should be transmitted within a system in order to solve dispatching problem of an electric power system, and improvement in the speed of operation by processing information in the parallel mode.

In accordance with the object of the invention a system for dispatching and controlling of generation of an electric power system consisting of a plurality of power units, said system for dispatching and controlling of generation comprising a computer with a specified dispatching optimization module, said computer connected by communications means to the power units, is characterized in that in the electric power system consisting of a plurality of subsystems each comprising a plurality of power plants provided with power units, said computer is a higher-layer computer and the specified dispatching optimization module is designed to determine parameters for an optimal interchange of power and energy between subsystems, wherein said controlling system further comprises a plurality of computers according to a number of subsystems, said computers being lower-layer computers each comprising a specified subsystem dispatch optimization module designed to determine parameters for an optimal dispatch of generation between power plants within a subsystem, and a unit for computation of functional characteristics for each subsystem, wherein each lower-layer computer is connected by lower-layer communications means to respective power plants of respective subsystems, and said dispatching and controlling system also comprises higher-layer communications means, wherein the lower-layer computers are connected to a higher-layer computer via the higher-layer communications means.

Preferably the higher-layer computer is designed to compute driving variables for a plurality of subsystems, wherein said variables for the plurality of subsystems are optimal power flows between subsystems.

Preferably the subsystem functional characteristic computation unit is designed to determine a relationship between subsystem boundary variables and subsystem Lagrange multipliers when optimality conditions for a subsystem dispatch of generation are met and internal constraints in the form of equalities and inequalities are observed.

Preferably the lower-layer communications means are provided as a telephone, digital communications, satellite or Internet/Intranet communications network.

According to the invention the system for dispatching and controlling of generation in an electric power system (EPS) allows solution of the main problem—determination of power to be generated by each plant included in the EPS for each time at the limitations as follows: 1) provision of necessary power for each consumer coupled to the EPS at a specified voltage quality; 2) compliance with all necessary limitations imposed upon the EPS dispatching of generation and determined by requirements of safe and reliable operation of all apparatuses operating within the EPS; 3) compliance with all limitations imposed upon energy resource consumption within a specified period.

At compliance with all said limitations, dispatching of generation obtained for each moment within the specified time period should meet the condition of minimizing total expenses for electrical energy production within the specified period (or minimizing expenses for electrical energy purchase at the electrical energy market).

The claimed invention permits the following: 1) significant reduction in a total time for solving the optimum dispatch problem, determined as an input data preparation time and a time spent for computations and information transmission; 2) significant reduction in a total volume of information transmission in the inventive dispatching and controlling of generation system; 3) maintenance of confidentiality in respect with information about internal characteristics and the internal dispatch of generation of a subsystem.

BRIEF DESCRIPTION OF DRAWINGS

The invention will be further explained by description of preferred embodiments thereof with references to the accompanying drawings, wherein.

Figure 1:
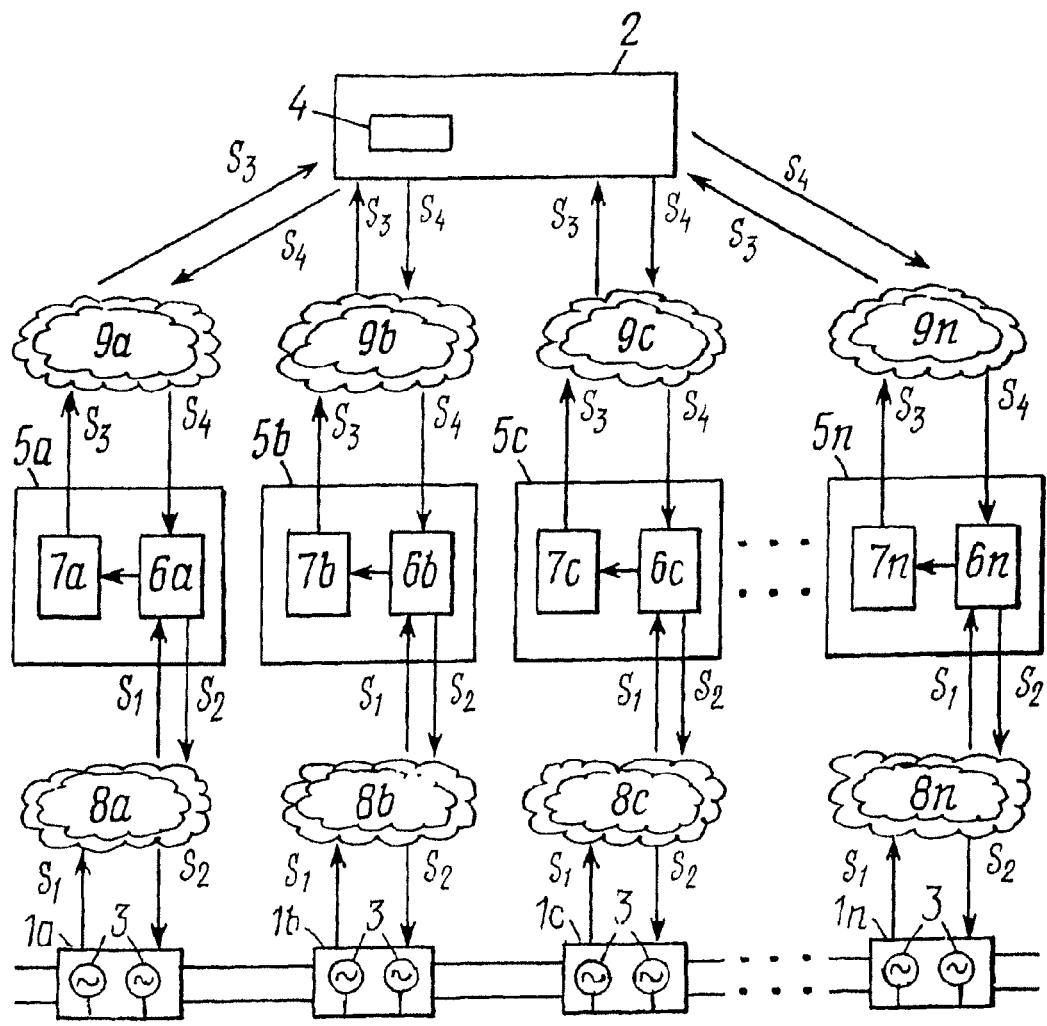
FIG. 1 shows a block diagram of an inventive system for dispatching and controlling of generation in electric power systems according to the invention.

DESCRIPTION OF THE PREFERRED
EMBODIMENTS OF THE INVENTION

The system for dispatching and controlling of generation in electric power system consisting of a plurality of subsystems $1a, 1b, 1c, \ldots 1n$ (FIG. 1), said system for dispatching and controlling of generation in electric power system comprises a computer $2$ that is a higher-layer computer.

Each subsystem $1a, 1b, 1c, \ldots 1n$ comprises a plurality of power plants $3$.

The system for dispatching and controlling of generation comprises a specified dispatching optimization module $4$, solving the problem of optimal interchange of power and energy between subsystems, said module $4$ is designed to determine parameters for an optimal interchange of power between subsystems on the basis of determining power flows and connected to the higher-layer computer $2$.

The system for dispatching and controlling of generation also comprises a plurality of computers $5a, 5b, 5c, \ldots 5n$ according to a number of subsystems, said computers being lower-layer computers each being within a respective subsystem of the electric power system.

Each lower-layer computer $5a, 5b, 5c, \ldots 5n$ comprises a specified optimization of internal dispatch of generation within subsystem module $6a, 6b, 6c, \ldots 6n$ designed to determine parameters for an optimal dispatch of generation between power plants within a subsystem, and a unit $7a, 7b, 7c, \ldots 7n$ for computation of functional characteristics for each subsystem, wherein each lower-layer computer $5a, 5b, 5c, \ldots 5n$ is connected by lower-layer communications means $8a, 8b, 8c, \ldots 8n$ to respective power plants $3$ of respective subsystems $1a, 1b, 1c, \ldots 1n$.

The system for dispatching and controlling of generation also comprises higher-layer communications means $9a, 9b, 9c, \ldots 9n$, wherein lower-layer computers $5a, 5b, 5c, \ldots 5n$ are connected to the higher-layer computer $2$ via higher-layer communications means $9a, 9b, 9c, 9n$.

The higher-layer computer $2$ is designed to compute driving variables for a plurality of subsystems, wherein the variables for the plurality of subsystems are optimal power flows between subsystems $1a, 1b, 1c, \ldots 1n$.

A unit for determining optimal values for boundary variables, that is, variables representing power flows, crossing boundary nodes of subsystems in the electrical power system is realized in the higher-layer computer $2$ to solve a system of equations. Said variables are values of power flows between subsystems. Said system of equations, that is, a system of constraint equations, has a dimensionality corresponding to a number of power transmission lines that connect subsystems of the electrical power system to each other.

The functional characteristic of subsystem computation unit $7a, 7b, 7c, \ldots 7n$ is designed to determine a relationship between boundary variables of subsystems and Lagrange multipliers of subsystems $1a, 1b, 1c, \ldots 1n$ when optimality conditions of dispatch of generation within a subsystem are met and internal constraints in the form of equalities and inequalities are observed. These Lagrange multipliers pertain to boundary variables of subsystems.

The lower-layer communications means $8a, 8b, 8c, \ldots 8n$ and the higher-layer communications means $9a, 9b, 9c, \ldots 9n$ are provided as a telephone, digital communications, satellite or Internet/Intranet communications network.

The system for dispatching and controlling of generation between power plants in an electric power system operates as follows.

All information relating to one of subsystems $1a, 1b, 1c, \ldots 1n$ and being necessary to solve a problem of computing an optimum dispatch of generation in the electric power system is transmitted through the lower-layer communications means $8a, 8b, 8c, \ldots 8n$ to a respective lower-layer computer $5a, 5b, 5c, \ldots 5n$. This information stream is denoted by S1 (FIG. 1). This information contains data on input-output characteristics of power generation units included in respective subsystems of the EPS for systems operating under regulation or information of electrical energy tariffs for plants in a system operating under regulated market conditions, or information about bids for selling electric energy of individual plants within a system operating under competitive market conditions.

Information on the optimum dispatch of generation computed by the system is transmitted through said communications means as well. This information stream is denoted by S2. The information stream directed from each computer $5a, 5b, 5c, \ldots 5n$ through the higher-layer communications means $9a, 9b, 9c, \ldots 9n$ to the higher-layer computer $2$ contains data of functional characteristics for each subsystem and is denoted by S3.

The information stream containing data of boundary variables for each subsystem $1a, 1b, 1c, \ldots 1n$ and being denoted by S4 goes in the reverse direction.

In solution of the problem of computing an optimal dispatch of generation of the electric power system, the inventive system operates as follows.

In each subsystem $1a, 1b, 1c, \ldots 1n$, input data necessary to solve the problem are supplied in the information stream S1 through the lower-layer communications means $8a, 8b, 8c, \ldots 8n$ to a lower-layer computer $5a, 5b, 5c, \ldots 5n$ located in said subsystem. Modules $6a, 6b, 6c, \ldots 6n$ compute an optimal dispatch of generation between plants located in each subsystem on the basis of input data and initial approximation of power flows on the borders of each subsystem. Then computation of a functional characteristic corresponding to an internal optimal dispatch of generation computed in the optimization module is performed for each subsystem. Functional characteristic data for each subsystem are supplied through the higher-layer communications means 9a, 9b, 9c, . . . 9n in information streams denoted by S3 to the higher-layer computer 2. This computer builds up and solves the system of connection equations on the basis of the obtained data. As a result of solving this system of equations, a vector of optimal values for boundary variables in a specified iteration, that is, inter-subsystem power flows corresponding to parameters of functional characteristics and accepted delimitation of subsystems, is determined. A sub-vector of a complete vector of values taken by boundary variables, pertaining to each subsystem, is then transmitted through the higher-layer communications means 9a, 9b, 9c, . . . 9n in one of information streams S4, and is directed to that of lower-layer computers 5a, 5b, 5c, . . . 5n, which are located in these subsystems.

The optimization modules then compute again values of the internal variables that meet values of the boundary variables computed in the higher-layer computer 2. The units then compute again functional characteristics of each subsystem for computed values of internal variables, and information of said characteristics is transmitted in information streams to the higher-layer computer 2 that newly builds up and solves the system of constraint equations.

Power flow values in individual iterations can be computed as complete values and also by incrementing the flow values at a specified iteration. In the latter case, said values compensate for residuals in equations that represent optimality conditions for power flow values. If residual values $\Delta S$ in the optimality equations reach values not higher than specified values, that is, E, the iteration process stops, and a flow vector resulted from the final iteration is considered as a vector of optimal power flow values.

The respective message and the resulted vector are transmitted in the information stream denoted by S4 to the lower-layer computers 5a, 5b, 5c, . . . 5n. In this case, the values of the internal variables computed once more for subsystems in the resulted optimal dispatch of generation are transmitted through the lower-layer communications means 8a, 8b, 8c, . . . 8n in the information streams denoted by S2 to each subsystem for execution. When the optimality conditions are not met in the higher-layer computer 2, the iteration process continues.

Figure 2:
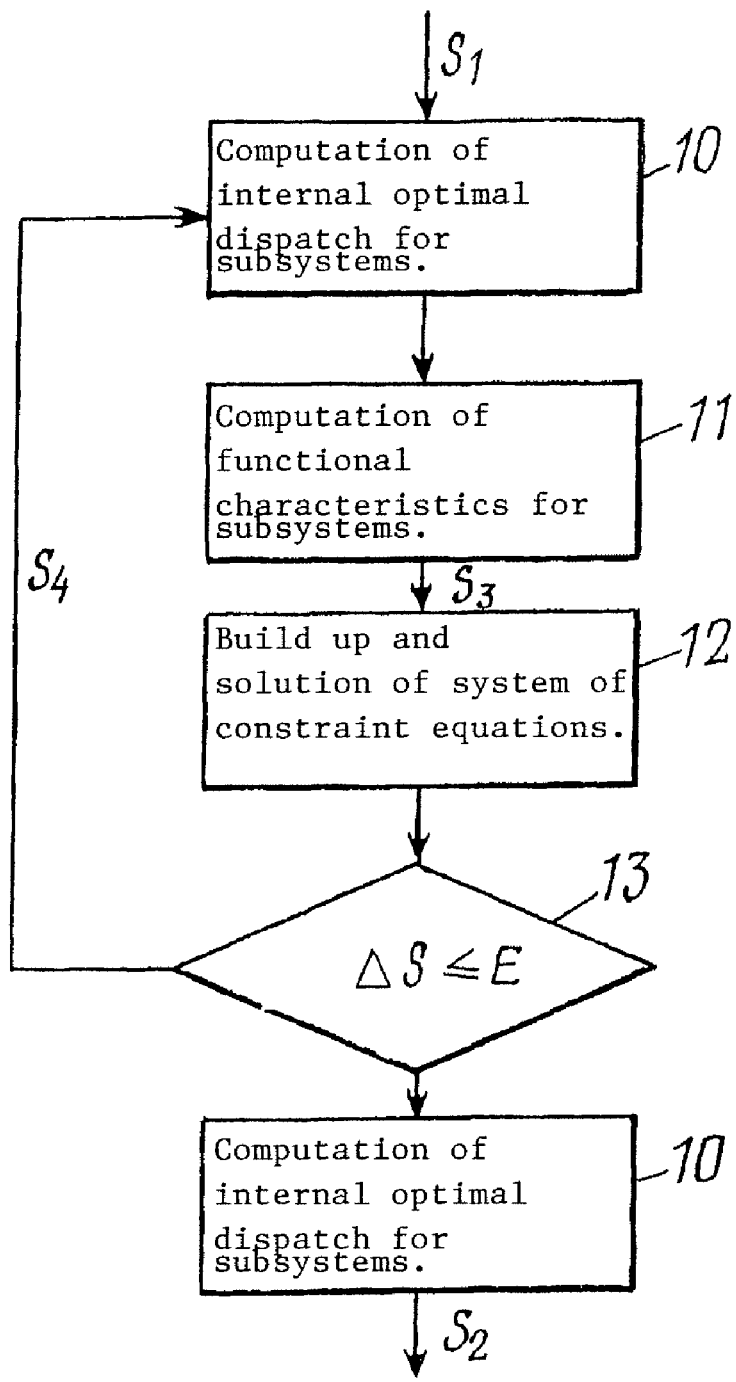
FIG. 2 shows a flowchart of operating the inventive system for dispatching and controlling of generation in electric power systems according to the invention.

FIG. 2 shows a flowchart of operating the inventive system for controlling, said flowchart representing the sequence of performed steps as follows: block 10 —computation of an internal optimal dispatch for subsystems; block 11—computation of functional characteristics for subsystems; block 12—build up and solution of a system of constraint equations. There is a parallel mode of computations in all lower—layer computers 5a, 5b, 5c, . . . 5n according to blocks 10 and 11, while the higher-layer computer 2 executes all computations according to block 12. The conditional jump 13 shown in the present algorithm determines a condition of terminating the mode optimization process.

The subsystem characteristics to be computed in said blocks represent relationships between values of Lagrange multipliers and derivatives of power losses, (from one hand, and) with values of subsystem boundary variables, when optimality conditions for internal dispatch of generation in subsystems are met and internal constraints in the form of equalities and inequalities are observed. The system of constraint equations to be built up and solved in the higher-layer computer 2 has a dimensionality corresponding to a number of subsystem boundary variables in a system model and includes equations determining optimality conditions for boundary variables (O.A. Soukhanov, S.C. Shill "Application of functional modeling to the solution of electrical power systems optimization problems", Int. Journ. of Electrical Power & Energy Systems, 2000, No. 2).

INDUSTRIAL APPLICABILITY

As compared with the centralized control systems, the system according to the invention provides great reduction in the total volume of information transmitted to solve a problem of computing an optimum dispatch of generation for a large electrical power system, and multiple reduction in time necessary to solve said problem. Thus, there is significant improvement in the speed of operation and the functioning efficiency of the inventive dispatching system. Accomplishment of said advantages takes place due to parallel and distributed organization of the information-and-computation process of solving the optimum dispatching problem in the system. Said system provides also maintaining of confidentiality in respect with information about internal characteristics and the internal dispatch of generation of a subsystem.

The invention claimed is:

1. A system for dispatching and controlling of generation of an electric power system consisting of a plurality of power units, said system for dispatching and controlling of generation comprising a computer with a specified dispatching optimization module, said computer connected by communications means to the power units, characterized in that in the electric power system consisting of a plurality of subsystems each comprising a plurality of power plants provided with power units, said computer is a higher-layer computer and the specified dispatching optimization module is designed to determine parameters for an optimal interchange of power and energy between subsystems, wherein said controlling system further comprises a plurality of computers according to a number of subsystems, said computers being lower-layer computers each comprising a specified subsystem dispatch optimization module designed to determine parameters for an optimal dispatch of generation between power plants within a subsystem, and a unit for computation of functional characteristics for each subsystem, wherein each lower-layer computer is connected by lower-layer communications means to respective power plants of respective subsystems, and said dispatching and controlling system also comprises higher-layer communications means, wherein the lower-layer computers are connected to a higher-layer computer via the higher-layer communications means.

2. The system according to claim 1, characterized in that the higher-layer computer is designed to fulfill the following: to receive data on functional characteristics from the lower layer computers; to compute optimal power flows between the subsystems, driving variables for a plurality of subsystems; and to send information on values of optimal power flows between the subsystems to the lower-layer computers.

3. The system according to claim 1, characterized in that the subsystem functional characteristic computation unit is designed to determine a relationship between subsystem boundary variables and subsystem Lagrange multipliers when optimality conditions for a subsystem dispatch of generation are met and internal constraints in the form of equalities and inequalities are observed.

4. The system according to claim 1, characterized in that the lower-layer communications means are provided as a telephone, digital communications, satellite or Internet/Intranet communications network.

* * * * *

UNITED STATES PATENT AND TRADEMARK OFFICE
CERTIFICATE OF CORRECTION

| | | |
|---|---|---|
| PATENT NO. | : 7,489,989 B2 | Page 1 of 1 |
| APPLICATION NO. | : 10/598720 | |
| DATED | : February 10, 2009 | |
| INVENTOR(S) | : Oleg Alexeevich Sukhanov | |

It is certified that error appears in the above-identified patent and that said Letters Patent is hereby corrected as shown below:

Title page, Col. 1 (Inventors), delete "3-449 113639," and insert --Zoologichesky per.,--.

Title page, Col. 1 (Inventors), "Zoologichesky per.," and insert --Ul. Krupskoi,--.

Signed and Sealed this

Twenty-fourth Day of March, 2009

JOHN DOLL
*Acting Director of the United States Patent and Trademark Office*